United States Patent
Lammers et al.

(10) Patent No.: US 10,932,611 B2
(45) Date of Patent: Mar. 2, 2021

(54) METHOD FOR RETRIEVING AROMA FROM A QUANTITY OF COFFEE PARTICLES AS PRESENT IN A COFFEE CHAMBER

(71) Applicant: KONINKLIJKE PHILIPS N.V., Eindhoven (NL)

(72) Inventors: Jeroen Herman Lammers, Eindhoven (NL); Christianus Martinus Van Heesch, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 339 days.

(21) Appl. No.: 15/579,386

(22) PCT Filed: Jun. 12, 2016

(86) PCT No.: PCT/EP2016/063411
§ 371 (c)(1),
(2) Date: Dec. 4, 2017

(87) PCT Pub. No.: WO2016/202705
PCT Pub. Date: Dec. 22, 2016

(65) Prior Publication Data
US 2018/0177330 A1    Jun. 28, 2018

(30) Foreign Application Priority Data

Jun. 19, 2015    (EP) .................................... 15172870

(51) Int. Cl.
    *A47J 31/44*    (2006.01)
    *A23F 5/26*    (2006.01)
(52) U.S. Cl.
    CPC ............. *A47J 31/4403* (2013.01); *A23F 5/26* (2013.01); *A47J 31/4489* (2013.01)

(58) Field of Classification Search
    CPC .... A47J 31/4403; A47J 31/4489; A47J 31/44; A47J 31/002; A47J 31/5255;
    (Continued)

(56) References Cited

U.S. PATENT DOCUMENTS

| 4,732,079 A | 3/1988 | Princz |
| 5,403,605 A | 4/1995 | Smith |

(Continued)

FOREIGN PATENT DOCUMENTS

| CN | 1126462 A | 7/1996 |
| CN | 102083345 A | 6/2011 |

(Continued)

*Primary Examiner* — Erik Kashnikow
*Assistant Examiner* — Lela S. Williams
(74) *Attorney, Agent, or Firm* — Schott, P.C.

(57) ABSTRACT

A method for retrieving aroma from a quantity of coffee particles as present in a coffee chamber (20) for containing a quantity of coffee particles comprises steps of providing outside of the coffee chamber (20) a low pressure area (34) where underpressure with respect to the coffee chamber (20) is prevailing, and opening the coffee chamber (20) to the low pressure area (34). A device (1) for brewing coffee, which is adapted to carry out such method, comprises a low pressure chamber (30) besides the coffee chamber (20) as mentioned, an arrangement (40, 41, 42) for creating a significant difference between pressure prevailing in the low pressure chamber (30) and pressure prevailing at a quantity of coffee particles, and an arrangement (23) for setting one of a closed condition and an opened condition of a communication path (22) connecting the low pressure chamber (30) to the coffee chamber (20).

20 Claims, 1 Drawing Sheet

(58) Field of Classification Search
CPC .......... A47J 31/469; A47J 31/46; A47J 31/00;
A47J 31/468; A47J 31/36; A47J 31/547;
A47J 31/42; A47J 31/0657
USPC .......... 99/283, 287, 291, 295, 300, 306, 323
See application file for complete search history.

(56) References Cited

U.S. PATENT DOCUMENTS

| | | | | |
|---|---|---|---|---|
| 6,393,967 B2 * | 5/2002 | Fischer | ............. | A47J 31/36 219/506 |
| 2009/0173237 A1 | 7/2009 | Chen | | |
| 2010/0229728 A1 | 9/2010 | Kiefer | | |
| 2011/0212236 A1 | 9/2011 | Nguyen | | |

FOREIGN PATENT DOCUMENTS

| | | |
|---|---|---|
| CN | 201958642 U | 9/2011 |
| CN | 102395304 A | 3/2012 |
| CN | 103493944 A | 1/2014 |
| CN | 104394741 A | 3/2015 |
| CN | 104431210 A | 3/2015 |
| EP | 2085001 A1 | 8/2009 |
| WO | 2014116976 A1 | 7/2014 |
| WO | 2014185783 A1 | 11/2014 |

* cited by examiner

METHOD FOR RETRIEVING AROMA FROM A QUANTITY OF COFFEE PARTICLES AS PRESENT IN A COFFEE CHAMBER

This application is the U.S. National Phase application under 35 U.S.C. § 371 of International Application No. PCT/EP2016/063411, filed on Jun. 12, 2016, which claims the benefit of International Application No. 15172870.6 filed on Jun. 19, 2015. These applications are hereby incorporated by reference herein.

FIELD OF THE INVENTION

The invention relates to a method for retrieving aroma from a quantity of coffee particles as present in a coffee chamber for containing a quantity of coffee particles. The invention further relates to a device for performing a process of brewing coffee on the basis of an interaction of a quantity of coffee particles with an extracting medium, comprising a coffee chamber for containing a quantity of coffee particles.

BACKGROUND OF THE INVENTION

Brewing coffee by providing a quantity of coffee particles, which may be a quantity of coffee powder, for example, i.e. a quantity of ground coffee beans, and causing the quantity of coffee particles to interact with an extracting medium such as hot water is a well-known process. Many types of devices have been developed for carrying out such a process in a more or less automated manner. One type of device is suitable to be operated for providing a quantity of coffee for a single cup in a relatively short period of time. In a device of such type, which is often referred to as a single-serve coffee maker, the coffee particles may be provided in pads or capsules. Alternatively, it is possible for a single-serve coffee maker to comprise a grinding module for grinding coffee beans to coffee powder, giving a user of the coffee maker a sense of optimal freshness of the coffee.

Research has shown that consumers enjoy the smell of coffee generated during a grinding process and/or a brewing process, and that the perception of quality of the coffee is linked to such smell. However, in a single-serve coffee maker, the quantity of coffee powder which is processed is so small that aroma release from the coffee maker is very limited. Even in case the coffee maker comprises a grinding module, it is hardly possible for the user of the coffee maker to smell the aroma. The fact is that only about 20 grams of coffee beans need to be ground for the purpose of making one cup of coffee. Moreover, in many cases, the grinding module is not open to the environment of the coffee maker. The same is true in respect of the brewing chamber, with the exception of the outlet which serves for dispensing coffee, and which is not suitable for allowing aroma to escape from the brewing chamber as a consequence thereof.

WO 2014/185783 discloses a coffee brewing apparatus comprising an entrance opening for receiving coffee beans, a grinder for grinding coffee beans which have entered the coffee brewing apparatus via the entrance opening, a ground coffee transportation path for transporting ground coffee from the grinder to a brewing device, the brewing device being adapted to brew coffee on the basis of the delivered ground coffee, and an air ventilation system in fluid connection with the grinder for providing at least one air stream comprising a coffee grinding aroma to the outside of the coffee brewing apparatus and preferably in the direction of a user of the apparatus. Hence, in the apparatus known from WO 2014/185783, the grinder is open to the environment of the apparatus. However, in spite of the use of the air ventilation system, the user can only be provided with a limited sense of coffee aroma in view of the fact that a small quantity of coffee beans is ground, suitable for obtaining one cup of coffee as explained earlier. Hence, the problem of the user having a perception of reduced quality of the operation of a single-serve coffee maker based on a lack of coffee smell is not completely solved by applying the measures known from WO 2014/185783.

In the case of a coffee maker which is adapted to make coffee on the basis of at least one pad to be inserted in coffee maker by a user, it may seem to be possible to retrieve aroma from the coffee powder as present inside the pad by forcing air to flow through the pad at some point. However, a problem associated with doing so is associated with the fact that a coffee pad is highly resistant to an airflow, when the coffee pad is in a dry condition, and even more so when the coffee pad is in a wet condition. As a result, any forced airflow is likely to go around the coffee pad, so that a cumbersome airtight seal needs to be provided around the coffee pad for preventing air leakage. Also, a pump which is suitable for realizing both a high pressure and a high flow rate, i.e. a pump of high power, cost, volume and weight, is required for generating the airflow as desired.

SUMMARY OF THE INVENTION

It is an object of the invention to alleviate the problem of very limited aroma release, if any, from known coffee makers, particularly conventional single-serve coffee makers, without needing to incorporate bulky and expensive components in the coffee makers. This object is achieved on the basis of a method as developed in the context of the invention for retrieving aroma from a quantity of coffee particles as present in a coffee chamber for containing a quantity of coffee particles, the method comprising the steps of providing a low pressure area outside of the coffee chamber, inside another chamber, in particular a low pressure chamber which is separate from the coffee chamber and which is connected to the coffee chamber through a communication path, keeping the communication path closed and creating a significant difference of larger than 0.1 bar between a first pressure prevailing at the quantity of coffee particles as present in the coffee chamber and a second pressure prevailing in the low pressure area, and opening the coffee chamber to the low pressure area by opening the communication path.

In a practical application of the invention, the method as defined in the foregoing involves in fact two stages, wherein a pressure difference between the coffee chamber and the low pressure area is created in a first instance, and wherein the coffee chamber is opened to the low pressure area in a second instance. For the sake of clarity, it is noted that the word "opened" as used in the phrase "the coffee chamber is opened to the low pressure area" should be understood such as to indicate an action of opening the coffee chamber to the low pressure area. In order to obtain effective coffee aroma retrieval, the pressure difference between the coffee chamber and the low pressure area is a significant pressure difference of at least 0.1 bar at the time the opening action is performed. Advantageously, the pressure difference is at least 1 bar, or at least 2 bar or higher.

Different from the known methods for retrieving coffee aroma, which are generally based on molecular diffusion or forced convection at near atmospheric pressure, the method according to the invention relies on the ability of gas to expand under the influence of a relatively low pressure, and is based on the insight that it is possible to use expanding gas for realizing effective extraction of aroma from coffee particles. The fact is that on the basis of the expansion process invoked under the influence of the relatively low pressure, gas as present inside a porous coffee particle is made to move to outside of the particle, carrying along aroma from inside the particle which cannot be released by the known methods. In case the coffee particles are contained in a pad or the like, the expanding gas is also very effective in displacing the coffee aroma from inside the pad to outside of the pad. Once coffee aroma is released from a quantity of coffee particles, and possibly also an enclosure of the coffee particles, by carrying out the method according to the invention, the coffee aroma can easily be transported further in any desired direction, in a well-controlled manner.

The phrase "opening the coffee chamber to the low pressure area" should not be understood such as to imply that leaky communication between the coffee chamber and the low pressure area is not possible in the first instance. According to the invention, a situation of leaky communication cannot be regarded as a situation in which the coffee chamber is really open to the low pressure area. Taking into account the above remarks about the coffee aroma retrieval being based on an expansion process of gas, it is clear that the invention involves a significant increase of the extent to which the coffee chamber is in communication with the low pressure area, which is preferably a sudden increase, and which may be an increase starting from zero, or an increase from a relatively small extent to a significantly larger extent.

According to the invention, enhanced release of coffee aroma from a quantity of coffee particles is realized by opening a coffee chamber where the coffee particles are present to a low pressure area, wherein gas as present in the coffee chamber, particularly gas as present inside the coffee particles, around/between the coffee particles, and in any porous paper filter material surrounding the particles is allowed to expand, so that aroma is extracted from inside the coffee particles and is retrieved from the coffee particles' environment as well. In this way, it is possible to obtain coffee aroma to such an extent that a consumer may be expected to have a perception of good quality of a coffee making process, even in case only one cup of coffee is made.

For the sake of completeness, it is noted that the term aroma as used in this text is intended to indicate smell as can be sensed by a consumer. In fact, the sensation of coffee aroma is based on a release of gases from the coffee, the gases comprising volatile organic compounds.

The invention is applicable to any type of coffee particles and any type of possible enclosure of the coffee particles. Hence, among other options, the options of having coarse coffee powder and fine coffee powder, wherein the coffee powder may be in a dry condition or a wet condition, and even the option of having whole coffee beans are covered by the invention, and so are the options of having coffee powder packed in a pad, coffee powder packed in a compressed puck and coffee powder without enclosure.

The low pressure area is provided inside another chamber, in particular a low pressure chamber which is connected to the coffee chamber through a communication path which is opened after having initially been kept closed, at least during the time needed for creating a significant pressure difference between the coffee chamber and the low pressure area. It is a feasible option to equip a coffee maker with an additional chamber for retrieving coffee aroma from the coffee chamber.

Within the framework of the invention, the low pressure area may be created inside the low pressure chamber as an area where a pressure lower than ambient pressure is prevailing. A first practical possibility in this respect involves moving gas out of the low pressure chamber. A second practical possibility in this respect involves supplying steam to the low pressure chamber and allowing the steam to condense inside the low pressure chamber, in which case the low pressure chamber is used as a condenser. An advantage of the latter possibility resides in the fact that a use of steam may already be foreseen for the purpose of making coffee.

Advantageously, the coffee chamber is opened to ambient air after having been opened to the low pressure area. At that point, air from outside the coffee chamber is allowed to enter in, to flow around the coffee particles and their possible enclosure(s), and to transport the coffee aroma thus collected to the low pressure area. The aromatized air can easily be transported further and diffused according to desire.

It is possible for the quantity of coffee particles from which aroma is retrieved to be used in a process for making a coffee beverage prior to opening the coffee chamber to the low pressure area. In other words, it is possible to first have a coffee brewing process on the basis of a quantity of coffee particles, and to subsequently have an aroma retrieving process on the basis of the same quantity of coffee particles. An advantage of this possibility is that loss of aroma from the coffee particles which are used for making the coffee is avoided, as the aroma for realizing an enhanced smell sensation for a consumer is extracted from the coffee particles only after the brewing process. In that way, it is ensured that the improvement of the consumer's perception of the quality of the coffee making process is not limited by a deterioration of the taste of the coffee. This aspect of the invention is a considerable improvement with respect to known measures based on having an air stream for transporting aroma from coffee powder that is intended to be used for making coffee, such as taught by WO 2014/185783.

The invention also relates to a device for performing a process of brewing coffee on the basis of an interaction of a quantity of coffee particles with an extracting medium, comprising a coffee chamber for accommodating a quantity of coffee particles, and further comprising a low pressure chamber which is separate from the coffee chamber and which is connected to the coffee chamber through a communication path, a pressure difference creating arrangement which is configured to create a significant difference of at least 0.1 bar between a first pressure prevailing at a quantity of coffee particles as present in the coffee chamber during operation of the device and a second pressure prevailing in the low pressure chamber so as to have an area of relatively low pressure for retrieving aroma from the quantity of coffee particles, and a condition setting arrangement which is configured to set one of a closed condition and an opened condition of the communication path, in particular to initially set a closed condition of the communication path when the pressure difference creating arrangement is operated to create the difference between the first pressure and the second pressure, and to subsequently set an opened condition of the communication path. The fact that the low pressure chamber is denoted as being separate from the coffee chamber should be understood such as to imply that the low pressure chamber is delimited from the coffee chamber so as to be not involved in the actual coffee brewing process during operation of the device, which does not alter the fact that the coffee chamber and the low pressure chamber may be arranged in any practical position with respect to each other, wherein it is possible to have a side-by-side configuration of the coffee chamber and the low pressure chamber if so desired in the layout of the device.

The coffee chamber can be at least one of a brewing chamber for accommodating a coffee making process and a container for storing coffee particles to be used in a coffee making process. In general, on the basis of the presence of the low pressure chamber in the device according to the invention, the device is capable of actively extracting aroma from a quantity of coffee particles in a way as described in the foregoing. The aroma may be extracted from coffee particles as present in the brewing chamber, in which case it is practical for the device to comprise a communication path connecting the low pressure chamber to the brewing chamber, and an arrangement which is configured to set one of an opened condition and a closed condition of the communication path. Additionally or alternatively, assuming that the device further comprises a container for storing coffee particles to be used in a coffee making process, wherein the coffee particles may come with or without enclosures, it is also possible for the aroma to be extracted from coffee particles as present in the container, in which case it is practical for the device to comprise a communication path connecting the low pressure chamber to the container, and an arrangement which is configured to set one of an opened condition and a closed condition of the communication path.

In order to realize a flow of aromatized air from the brewing chamber and/or the container and/or any possible other coffee chamber of the device for containing coffee particles to be used for coffee aroma enhancement to the low pressure chamber shortly after communication between the low pressure chamber and the coffee chamber has been established, it is advantageous if the coffee chamber is provided with at least one opening for allowing ambient air to enter in, the device further comprising an arrangement which is configured to set one of an opened condition and a closed condition of the opening. The low pressure chamber may be provided with at least one opening for allowing gas content of the low pressure chamber to exit the chamber and flow to outside of the device, the device further comprising an arrangement which is configured to set one of an opened condition and a closed condition of the opening. In this configuration of the device, it is actually possible to have transport of coffee aroma all the way from the position where it is extracted from a quantity of coffee particles to outside of the device, in order for the coffee aroma to reach a user of the device. According to a practical option, the device further comprises an arrangement for enhancing a gas flow from the low pressure chamber to outside of the device, through the opening. Such arrangement may comprise ventilation means such as a fan or an aspirator for enhancing and/or directing the outward airflow carrying the coffee aroma.

In case the device comprises a container and the low pressure chamber is connected to the container, it is advantageous if the device further comprises an arrangement which is configured to vary the volume of the container. The fact is that in such a case, it is possible for the device to adapt the volume of the container to the total quantity of coffee particles as present inside the container, in such a way that the volume of the container is as small as possible under all circumstances, which contributes to effectiveness of the aroma retrieval.

According to one possibility existing within the framework of the invention, the pressure difference creating arrangement comprises a pump for moving gas out of the low pressure chamber. According to another possibility existing within the framework of the invention, the pressure difference creating arrangement comprises a steam generator for supplying steam to the low pressure chamber, and the device further comprises a communication path connecting the steam generator to the low pressure chamber, and an arrangement which is configured to set one of an opened condition and a closed condition of the communication path. In the latter case, in conformity with what has been mentioned in the foregoing, the steam generator may be also adapted to supply steam and/or hot water to the brewing chamber and/or another part of the device using steam and/or hot water during operation, such as a milk frother, wherein the device further comprises a communication path connecting the steam generator to the brewing chamber, and an arrangement which is configured to set one of an opened condition and a closed condition of the communication path.

It is noted that the device according to the invention may comprise a grinding module for grinding coffee beans to coffee powder, and that the grinding module may be connected to a low pressure chamber in case it is desired for the device to be capable of retrieving coffee aroma from the grinding module. Further, it is practical for the device according to the invention to comprise a controller for controlling operation of the device, including setting the condition of the various arrangements for opening and closing communication paths of the device and openings to the ambient as mentioned earlier, which may be valve arrangements, according to a predetermined schedule. The use of a controller also offers an option of setting a level of aroma release from the device. To this end, the controller may be adapted to vary the time that the coffee chamber from which the coffee aroma is to be retrieved is open to the low pressure chamber, for example. In this respect, the device may comprise a user interface which allows a user of the device to input his/her preferences as to coffee aroma.

It follows from the foregoing that the invention provides for retrieval of coffee aroma by creating in a first instance a significant pressure difference of larger than 0.1 bar between an area where a quantity of coffee particles which are to be used as a source of the aroma are present on the one hand and a low pressure area on the other hand, in such a way that a situation is obtained in which a relatively high pressure is prevailing at the quantity of coffee particles and a relatively low pressure is prevailing in the low pressure area, prior to establishing communication between the quantity of coffee particles and the low pressure area in a second instance. In a first practical application of the invention, it may be so that the quantity of coffee particles is initially in an area of ambient pressure, in which case it is possible to have coffee aroma retrieval by establishing communication between the quantity of coffee particles and an area where a pressure below ambient pressure is prevailing. In a second practical application of the invention, it may be so that the quantity of coffee particles is initially in an area of overpressure, i.e. a pressure higher than ambient pressure, in which case it is possible to have coffee aroma retrieval by establishing communication between the quantity of coffee particles and an area where ambient pressure is prevailing. Thus, the first practical application of the invention involves measures for reducing the pressure prevailing in the low pressure area to a level lower than ambient pressure, whereas the second practical application of the invention involves measures for increasing the pressure prevailing at the quantity of coffee particles to a level higher than ambient pressure. It has been found that in the latter case, it is preferred to maintain the overpressure at the quantity of coffee particles for some time before exposing the quantity of coffee particles to an area of lower pressure in order to have an effective coffee aroma retrieval process. Advantageously, the time is sufficiently long for allowing coffee aroma to diffuse out of the solid parts of the coffee grains into the crevices containing gas as pressurized under the influence of the overpressure, so that the return of the pressure to ambient pressure carries this newly diffused portion outside the coffee grains, ready for further transport. In any case, it is noted that in order to have the coffee aroma retrieval effect as desired, the pressure difference which is realized between the area where the coffee particles are present and the area of relatively low pressure before opening the first area to the second area is advantageously larger than 0.1 bar, particularly larger than a pressure difference as can be present in a natural airflow or as can be created by using a fan.

The above-described and other aspects of the invention will be apparent from and elucidated with reference to the following detailed description of two embodiments of a device for brewing coffee, comprising a low pressure chamber for use in a process of extracting aroma from coffee particles as present in at least one coffee chamber of the device, i.e. a chamber which is adapted to contain a quantity of coffee particles.

BRIEF DESCRIPTION OF THE DRAWINGS

The invention will now be explained in greater detail with reference to the figures, in which equal or similar parts are indicated by the same reference signs, and in which.

DETAILED DESCRIPTION OF THE EMBODIMENTS

Figure 1:
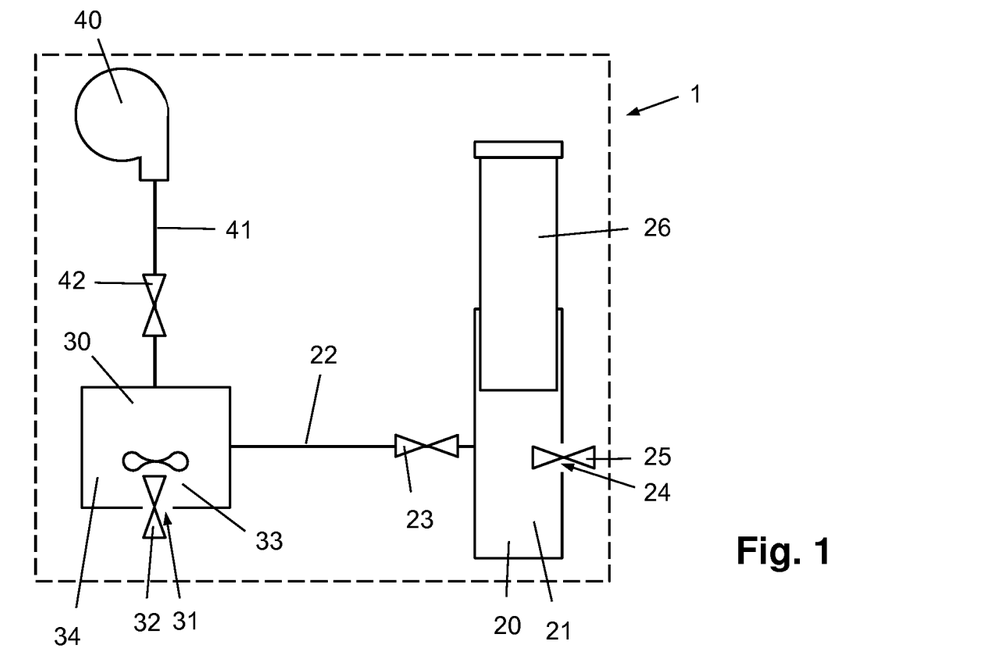
FIG. 1 diagrammatically shows a number of components of a device for brewing coffee according to a first embodiment of the invention, which is adapted to retrieve coffee aroma from a container thereof and FIG. 2 diagrammatically shows a number of components of a device for brewing coffee according to a second embodiment of the invention, which is adapted to retrieve coffee aroma from a brewing chamber thereof.
Figure 2:
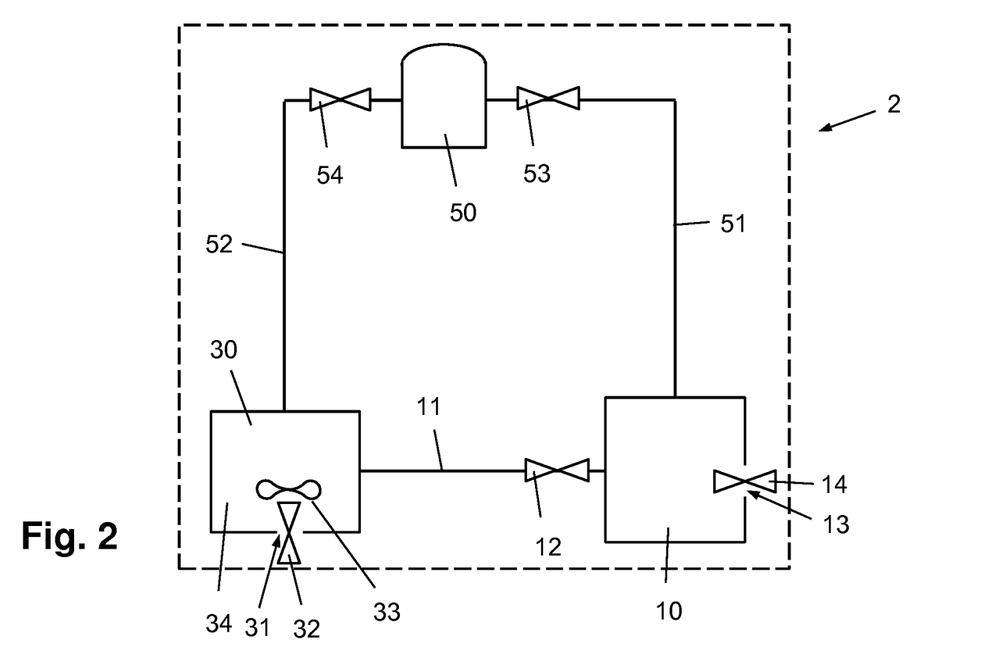

FIGS. 1 and 2 illustrate particulars of two possible embodiments of a device according to the invention, which is adapted to brew coffee, and which will hereinafter be referred to as coffee maker 1, 2. In general, brewing coffee is a process which involves providing a quantity of coffee particles and causing the quantity of coffee particles to interact with an extracting medium such as hot water and/or steam. In the following description of the coffee maker 1, 2 according to the invention, it is assumed that the quantity of coffee particles is provided as a quantity of coffee powder packed in a pad, i.e. enclosed by porous paper filter material, which does not alter the fact that the invention is similarly applicable to numerous other possibilities in respect of the way in which the coffee particles are provided.

As diagrammatically shown in FIG. 2, the coffee maker 1, 2 according to the invention comprises a brewing chamber 10, i.e. a chamber 10 where the actual brewing process takes place during operation of the coffee maker 1, 2. In a practical embodiment, the coffee maker 1, 2 is suitable for dispensing coffee for filling one cup at a time, although this is not essential in the framework of the invention. The brewing chamber 10 may be completely closed except for functional openings such as an opening for letting in at least one coffee pad to the brewing chamber 10 and an opening for discharging coffee from the brewing chamber 10, wherein one or more of such openings may be closeable by means of a valve or the like. In the practical case that a user of the coffee maker 1, 2 is expected to put the at least one coffee pad in place in the brewing chamber 10, it is advantageous for the brewing chamber 10 to be openable and closeable according to desire, which may be realized by having a hingeable arrangement of a portion of the wall delimiting the brewing chamber 10, for example. Practical options in respect of the brewing chamber 10 and the associated construction details of the brewing chamber 10 are well-known in the art and will not be elucidated here, and the same is applicable to all other components of the coffee maker 1 which are not directly involved in the invention, such as a system for heating water and supplying the water to the brewing chamber 10, which may include a pump, and/or a system for generating steam and supplying the steam to the brewing chamber 10.

As diagrammatically shown in FIG. 1, it is a practical option for the coffee maker 1, 2 according to the invention to comprise a container 20 for containing coffee pads.

With reference to FIG. 1, it is noted that the invention as applied to the coffee maker 1 according to the first embodiment resides in having an arrangement for retrieving coffee aroma from the interior space 21 of the container 20. In particular, this arrangement comprises a low pressure chamber 30 and a pump 40 for moving gas out of the low pressure chamber 30 in order to create a pressure below ambient pressure in the low pressure chamber 30. The pump 40 is connected to the low pressure chamber 30 through a communication line which will hereinafter be referred to as pump communication line 41, while the low pressure chamber 30 is connected to the container 20 through a communication line which will hereinafter be referred to as container communication line 22. For the purpose of having an opened condition or a closed condition of the pump communication line 41 and the container communication line 22, respectively, the coffee maker 1 is equipped with a valve which is associated with the pump communication line 41 and which will hereinafter be referred to as pump valve 42, and a valve which is associated with the container communication line 22, which will hereinafter be referred to as container valve 23. Furthermore, the container 20 is provided with an opening 24 to ambient air, which opening 24 is openable and closeable according to desire by means of a valve which will hereinafter be referred to as container inlet valve 25, and the low pressure chamber 30 is provided with an opening 31 to ambient air as well, which opening 31 is openable and closeable according to desire by means of a valve which will hereinafter be referred to as chamber outlet valve 32. Also, a fan 33 is associated with the opening 31 of the low pressure chamber 30.

When the user activates the coffee maker 1 for making a cup of coffee, the coffee maker 1 is not only made to perform a coffee brewing process, but also an additional process of providing the user with the smell of coffee by retrieving coffee aroma from the coffee pad(s) as present in the container 20 and allowing the coffee aroma to exit the coffee maker 1 and reach the user. The latter process comprises the steps as will be described in the following, wherein it is assumed that initially, all valves 23, 25, 32, 42 are in a closed condition and that the pump 40 and the fan 33 of the low pressure chamber 30 are in an inactive condition. As a first step in the process of realizing aroma retrieval, the pump 40 is activated and the pump valve 42 is put to an opened condition. In particular, the pump 40 is operated to move gas out of the low pressure chamber 30, through the pump communication line 41, as a result of which a pressure lower than ambient pressure is created in the low pressure chamber 30, the interior space 34 of the pressure chamber 30 constituting a low pressure area at that moment. When the pressure prevailing inside the low pressure chamber 30 is below a predetermined value, the pump 40 is deactivated and the pump valve 42 is put to the closed position again. Furthermore, the container valve 23 is put to an opened condition. At that point, the container 20, where normal ambient pressure is prevailing, is opened to the low pressure chamber 30. As a result, under the influence of the relatively low pressure prevailing in the low pressure chamber 30, a process of coffee aroma retrieval is initiated in the container 20, based on the expansion of gas inside the porous coffee particles, around/between the coffee particles, and in the porous paper filter material surrounding the coffee particles. In order to transport the freshly extracted coffee aroma from the container 20 to the low pressure chamber 30 through the container communication line 22, the container inlet valve 25 is put to an opened condition. Also, the chamber outlet valve 32 is opened and the fan 33 is activated so as to generate an aromatized airflow from the low pressure chamber 30 to outside of the coffee maker 1. Thus, it is achieved that notable coffee smell is provided to the user of the coffee maker 1. After some time, it is achieved that a sufficient quantity of coffee aroma is let out of the low pressure chamber 30, at which point the container valve 23, the chamber outlet valve 32 and the container inlet valve 25 can be put to the closed position again, and the fan 33 can be deactivated.

Preferably, the coffee maker 1 is designed such as to offer a possibility of letting the interior space 21 of the container 20 be as small as possible under all circumstances. In other words, it is preferred if measures are taken for ensuring that the volume of the container 20 is adjusted to the extent to which the container 20 is filled. This implies that every time a coffee pad is taken out of the container 20, the volume of the container 20 is decreased as long as no refill of the container 20 is performed. A volume adjustor of the container 20 is diagrammatically depicted in FIG. 1 and indicated by means of reference numeral 26. The volume adjustor 26 may comprise a movably arranged wall portion of the container 20, for example. Within the context of the invention, it has been found that having a volume of the container 20 which is as small as possible contributes to effectiveness of the aroma retrieval from the container 20. In this respect, it is noted that an embodiment of the coffee maker 1 in which at least a part of the container communication line 22 is used for storing coffee particles, i.e. serves as a container 20, is also feasible within the framework of the invention. In that embodiment, it is possible for the container communication line 22 to be connected directly to a grinding module, for example, in which case there is no need for having a separate container 20.

It is noted that the coffee maker 1 may be equipped with any suitable type of controller for controlling both the brewing process and the aroma retrieval process. In particular, such a controller can be used for setting the condition of each of the valves 23, 25, 32, 42 and for activating and deactivating the pump 40 and the fan 33 of the low pressure chamber 30 at appropriate moments, in an automated manner when the user has activated the coffee maker 1 for making coffee. The coffee aroma retrieval process may be performed prior to the coffee brewing process, during the coffee brewing process, and/or after the coffee brewing process, assuming that at least one coffee pad is still present in the container 20 after the coffee brewing process has started. The coffee maker 1 may be equipped with any suitable type of indicator of the extent to which the container 20 is filled and/or an empty status or near empty status of the container 20, as well as with any suitable system for controlling operation of the indicator.

By having the aroma retrieval process on the basis of evacuation of the low pressure chamber 30 by means of the pump 40 and subsequently opening the container 20 to the low pressure chamber 30, it is achieved that the user is provided with a sensation of coffee aroma which would otherwise be only very limited or even totally absent. The user is inclined to have a better appreciation of the quality of the coffee, and thereby of the functioning of the coffee maker 1, when he/she is provided with the smell of coffee as foreseen by the invention.

FIG. 2 illustrates a possibility of retrieving coffee aroma from the brewing chamber 10, which may be realized in addition to or as an alternative of the above-described possibility of retrieving coffee aroma from the container 20. In particular, FIG. 2 diagrammatically shows components of the coffee maker 2 according to the second embodiment. The brewing chamber 10 of the second embodiment is comparable to the container 20 of the first embodiment in that the low pressure chamber 30 is connected to the brewing chamber 10 through a communication line 11 which is openable and closeable by means of a valve 12, and in that the brewing chamber 10 is provided with an opening 13 to ambient air and a valve 14 for determining the condition of the opening 13. The communication line 11 between the low pressure chamber 30 and the brewing chamber 10 will be referred to as brewing communication line 11, the valve 12 associated with the brewing communication line 11 will be referred to as brew valve 12, and the valve 14 associated with the opening 13 of the brewing chamber 10 will be referred to as brew inlet valve 14.

In the coffee maker 2 according to the second embodiment, a steam generator 50 is used for reducing pressure in the low pressure chamber 30 to below ambient pressure, wherein it is noted that the low pressure chamber 30 is designed such as to function as a condenser. The steam generator 50 may have both a function in generating steam to be supplied to the brewing chamber 10 and a function in generating steam to be used for reducing pressure inside the low pressure chamber 30, although this is not essential within the framework of the invention. When a steam generator is part of an original design of a coffee maker, the invention can be incorporated relatively easy in the coffee maker when the steam generator is provided with an additional function of generating steam for use of creating a pressure below ambient pressure, wherein the control of the steam generator can be adjusted such as to realize enhanced steam production during the time that the relatively low pressure needs to be created. Ways of using steam for creating a pressure below ambient pressure are generally known and will not be elucidated here. It is noted that in general, a condenser is a device having an interior surface for steam to condense on, and that pressure reduction is obtained in a condenser as a natural result of the steam condensation process. Among other things, the low pressure chamber 30 may be associated with means for cooling the low pressure chamber 30 at the outside. Condense can be collected and reused for coffee brewing.

In the shown example, the brewing chamber 10 is connected to the steam generator 50 through a primary steam communication line 51, while the low pressure chamber 30 is connected to the steam generator 50 through a secondary steam communication line 52. For the purpose of having an opened condition or a closed condition of the primary steam communication line 51 and the secondary steam communication line 52, respectively, the coffee maker 2 is equipped with a valve which is associated with the primary steam communication line 51 and which will hereinafter be referred to as primary steam valve 53, and a valve which is associated with the secondary steam communication line 52, which will hereinafter be referred to as secondary steam valve 54.

The aroma retrieving process which is performed during operation of the coffee maker 2 according to the second embodiment comprises the steps as will be described in the following, wherein it is assumed that initially, all valves 12, 14, 32, 53, 54 are in a closed condition and that the steam generator 50 and the fan 33 of the low pressure chamber 30 are in an inactive condition. As a first step in the process of realizing aroma retrieval, the steam generator 50 is activated and the secondary steam valve 54 is put to an opened condition so as to supply steam to the low pressure chamber 30 through the secondary steam communication line 52. In the low pressure chamber 30, the steam condenses, as a result of which pressure reduction is obtained in the low pressure chamber 30. When the pressure prevailing inside the low pressure chamber 30 is below a predetermined value, the secondary steam valve 54 is put to the closed position again and the steam generator 50 is deactivated unless it is still required to supply steam to the brewing chamber 10 through the primary steam communication line 51. Furthermore, the brew valve 12 is put to an opened condition. At that point, the brewing chamber 10 is opened to the low pressure chamber 30. As a result, under the influence of the relatively low pressure prevailing in the low pressure chamber 30, a process of coffee aroma retrieval is initiated in the brewing chamber 10, based on the expansion of gas inside the porous coffee particles, around/between the coffee particles, and in the porous paper filter material surrounding the coffee particles, as already described in respect of the aroma retrieval process associated with the coffee maker 1 according to the first embodiment. In order to transport the freshly extracted coffee aroma from the brewing chamber 10 to the low pressure chamber 30 through the brew communication line 11, the brew inlet valve 14 is put to an opened condition. Also, the chamber outlet valve 32 is opened and the fan 33 is activated so as to generate an aromatized airflow from the low pressure chamber 30 to outside of the coffee maker 2. Thus, it is achieved that notable coffee smell is provided to the user of the coffee maker 2. After some time, it is achieved that a sufficient quantity of coffee aroma is let out of the low pressure chamber 30, at which point the brew valve 12, the chamber outlet valve 32 and the brew inlet valve 14 can be put to the closed position again, and the fan 33 can be deactivated.

As already noted in respect of the coffee maker 1 according to the first embodiment, the coffee maker 2 according to the second embodiment may be equipped with any suitable type of controller for controlling both the brewing process and the aroma retrieval process. In particular, such a controller can be used for setting the condition of each of the valves 12, 14, 32, 53, 54 and for activating and deactivating the steam generator 50 and the fan 33 of the low pressure chamber 30 at appropriate moments, in an automated manner when the user has activated the coffee maker 2 for making coffee. Also, as is the case with the coffee maker 1 according to the first embodiment, the coffee aroma retrieval process may be performed prior to the coffee brewing process, during the coffee brewing process, and/or after the coffee brewing process. The aroma retrieval process may be performed on coffee pads in an initial dry condition and/or a subsequent wet condition.

Preferably, in order for the volume to be exposed to the influence of a relatively low pressure to be as small as possible, it is preferred if the brew valve 12 is positioned as close as possible to the brewing chamber 10. An alternative start-up procedure of the aroma retrieval process involves filling the low pressure chamber 30 with steam and thereby flushing the gas from the low pressure chamber 30, followed by flushing the brewing chamber 10 with steam in order to let the gas out of the brewing chamber 10.

Both the container 20 as described in respect of the coffee maker 1 according to the first embodiment and the brewing chamber 10 as described in respect of the coffee maker 2 according to the second embodiment are examples of a coffee chamber 10, 20 from which coffee aroma is to be retrieved. In respect of the valves 12, 14, 23, 25 which are directly associated with the coffee chamber 10, 20, it is noted that these valves 12, 14, 23, 25 may be leaky, and even passive. In particular, it is possible to have a small hole between the coffee chamber 10, 20 as mentioned and the low pressure chamber 30, provided that such hole is small enough to allow evacuation of the coffee chamber 10, 20 on a longer timescale than needed to evacuate and seal the low pressure chamber 30. Another, even smaller hole, involving an even longer timescale, will do to suck in ambient air into the coffee chamber 10, 20. If the coffee aroma is retrieved from a container 20 as is the case with the coffee maker 1 according to the first embodiment, it is practical for the valves 23, 25 to passively open only at a significant pressure difference, for example, more than about 0.1 bar, thus ensuring preservation of the coffee material, away from the ambient, and preventing any possibly humid air from entering in from the low pressure side at some other stage in the coffee brewing process. The pump 40 as used in the coffee maker 1 according to the first embodiment may be of any suitable type, as long as the pump 40 is adapted to be used for significantly reducing the pressure prevailing inside the low pressure chamber 30. According to a first feasible possibility, the pump 40 may be an electrical pump, such as the type of pump which is normally used to evacuate food containers for better storage, which pump can go down to 0.3 bar absolute pressure. According to a second feasible possibility, the pump 40 may be a mechanical pump, such as a hydraulic pump comprising a chamber which is increased in size. According to a third feasible possibility, the pump 40 may be a steam pump, such as a pump in which low pressure is generated by cooling a steam heated closed chamber, in conformity with what has been noted in respect of the possibility for the low pressure chamber 30 to be combined with a steam generator 50 and to be designed as a condenser, as is the case with the coffee maker 2 according to the second embodiment. The pump 40 needs to be capable of realizing a significant reduction of pressure with respect to ambient pressure, but is allowed to have a low gas flux, as it is possible to allow some time for evacuating the low pressure chamber 30. Thus, the pump 40 can be of relatively low power, volume and weight. The relatively low pressure to be created inside the low pressure chamber 30 may be a pressure as low as 0.1 bar, for example, for achieving effective retrieval of coffee aroma from an area where ambient pressure is prevailing, as is the case in the shown examples.

It will be clear to a person skilled in the art that the scope of the invention is not limited to the examples discussed in the foregoing, but that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details that are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The term "comprise" as used in this text will be understood by a person skilled in the art as covering the term "consist of". Hence, the term "comprise" may in respect of an embodiment mean "consist of", but may in another embodiment mean "contain/include at least the defined species and optionally one or more other species".

It is noted that the various communication lines as present in the shown embodiments of the coffee maker 1, 2 according to the invention should be understood such as to be examples of the communication paths which are foreseen to be present between the various elements of the coffee maker 1, 2 as indicated. The paths may comprise physical lines, but it is also possible for elements to be arranged side by side, and for openings of the elements to coincide, for example.

Summarizing, the invention relates to a method for retrieving aroma from a quantity of coffee particles as present in a coffee chamber 10, 20 for containing a quantity of coffee particles, comprising subsequent steps of providing outside of the coffee chamber 10, 20 a low pressure area 34 where underpressure with respect to the coffee chamber 10, 20 is prevailing, creating a pressure difference between a pressure prevailing at the quantity of coffee particles as present in the coffee chamber 10, 20 and a pressure prevailing in the low pressure area 34 so as to be larger than 0.1 bar, and opening the coffee chamber 10, 20 to the low pressure area 34. By opening the coffee chamber 10, 20 to the low pressure area 34 where a relatively low pressure is prevailing at that time, it is achieved that coffee aroma is extracted from the coffee particles due to expansion of gas, which is invoked in that way. Furthermore, the invention relates to a device 1, 2 for performing a process of brewing coffee on the basis of an interaction of a quantity of coffee particles with an extracting medium, which is adapted to carry out such method, and which comprises a coffee chamber 10, 20 for containing a quantity of coffee particles, and further comprises a low pressure chamber 30 which is separate from the coffee chamber 10, 20, and an arrangement 40, 41, 42; 50, 52, 54 for creating a significant difference of larger than 0.1 bar between pressure prevailing in the low pressure chamber 30 and pressure prevailing at a quantity of coffee particles as present in the coffee chamber 10, 20 during operation of the device 1, 2 such as to obtain the area 34 of relatively low pressure which is suitable to be used for realizing aroma enhancement. Creating the significant pressure difference as mentioned results in an initial situation in which a relatively low pressure is prevailing in the low pressure chamber 30 and a relatively high pressure is prevailing at the quantity of coffee particles to be used as a source of coffee aroma. Starting from that situation, the coffee aroma is retrieved from the quantity of coffee particles as soon as communication between the quantity of coffee particles and the low pressure area 34 is established. The relatively high pressure may be ambient pressure, in which case the relatively low pressure is a pressure below ambient pressure, but it is also possible for the relatively high pressure to be an overpressure, in which case the relatively low pressure may be ambient pressure. In the first case, the arrangement for creating the pressure difference only needs to be an arrangement 40, 41, 42; 50, 52, 54 which is suitable for reducing a pressure below ambient pressure, whereas in the latter case, the arrangement for creating the pressure difference only needs to be an arrangement which is suitable for creating overpressure.

The invention claimed is:

1. A method for retrieving aroma from a quantity of coffee particles as present in a coffee chamber for containing a quantity of coffee particles, the method comprising steps of:
providing a low pressure area inside a low pressure chamber which is separate from the coffee chamber and which is connected to the coffee chamber through a communication path, wherein the low pressure area and low pressure chamber are outside of the coffee chamber,
keeping the communication path closed and creating a pressure difference of larger than 0.1 bar between a first pressure prevailing at the quantity of coffee particles as present in the coffee chamber and a second pressure prevailing in the low pressure area, and
opening the coffee chamber to the low pressure area by opening the communication path.

2. The method according to claim 1, wherein the low pressure area is created inside the low pressure chamber by moving gas out of the low pressure chamber.

3. The method according to claim 1, wherein the low pressure area is created inside the low pressure chamber by supplying steam to the low pressure chamber and allowing the steam to condense inside the low pressure chamber.

4. The method according to claim 1, wherein the coffee chamber is opened to ambient air after having been opened to the low pressure area.

5. The method according to claim 1, wherein the quantity of coffee particles is used in a process for making a coffee beverage prior to opening the coffee chamber to the low pressure area.

6. The method according to claim 1, wherein the coffee chamber is opened to the low pressure area when the pressure difference between the first pressure and the second pressure is at least 1 bar, or at least 2 bar or higher.

7. A device for performing a process of brewing coffee on the basis of an interaction of a quantity of coffee particles with an extracting medium, comprising a coffee chamber for containing a quantity of coffee particles, and further comprising:
a low pressure chamber which is separate from the coffee chamber and which is connected to the coffee chamber through a communication path,
a pressure difference creating arrangement which is configured to create a pressure difference of larger than 0.1 bar between a first pressure prevailing at a quantity of coffee particles as present in the coffee chamber during operation of the device and a second pressure prevailing in the low pressure chamber so as to have an area of relatively low pressure in the low pressure chamber for retrieving aroma from the quantity of coffee particles, and a condition setting arrangement which is configured to set one of a closed condition and an opened condition of the communication path, wherein the condition setting arrangement is further configured to initially set the closed condition of the communication path when the pressure difference creating arrangement is operated to create the pressure difference between the first pressure and the second pressure, and to subsequently set the opened condition of the communication path.

8. The device according to claim 7, wherein the coffee chamber is provided with at least one opening for allowing ambient air to enter in, the device further comprising an arrangement which is configured to set one of an opened condition and a closed condition of the at least one opening.

9. The device according to claim 7, wherein the coffee chamber is at least one of a brewing chamber for accommodating a coffee making process and a container for storing coffee particles to be used in the coffee making process.

10. The device according to claim 7, wherein the coffee chamber is at least a container for storing coffee particles to be used in a coffee making process, the device further comprising an arrangement which is configured to vary a volume of the container.

11. The device according to claim 7, wherein the pressure difference creating arrangement comprises a pump for moving gas out of the low pressure chamber.

12. The device according to claim 7, wherein the pressure difference creating arrangement comprises a steam generator for supplying steam to the low pressure chamber, the device further comprising a communication path connecting the steam generator to the low pressure chamber, and an arrangement which is configured to set one of an opened condition and a closed condition of the communication path.

13. The device according to claim 12, wherein the coffee chamber is at least a brewing chamber for accommodating a coffee making process, and wherein the steam generator is also configured to supply steam to the brewing chamber, the device further comprising a communication path connecting the steam generator to the brewing chamber, and an arrangement for setting one of an opened condition and a closed condition of the communication path.

14. The device according to claim 7, wherein the low pressure chamber is provided with at least one opening for allowing gas content of the low pressure chamber to exit the low pressure chamber and flow to outside of the device, the device further comprising an arrangement which is configured to set one of an opened condition and a closed condition of the at least one opening.

15. The device according to claim 7, wherein the pressure difference creating arrangement is configured to create a pressure difference between the first pressure and the second pressure of at least 1 bar, or at least 2 bar or higher.

16. A device for retrieving aroma from a quantity of coffee particles as present in a coffee chamber, the device comprising:

a low pressure chamber which is separate from the coffee chamber and which is connected to the coffee chamber through a communication path, a pressure difference creating arrangement which is configured to create a pressure difference of larger than 0.1 bar between a first pressure prevailing at a quantity of coffee particles as present in the coffee chamber during operation of the device and a second pressure prevailing in the low pressure chamber, and a condition setting arrangement configured to:
  initially set a closed condition of the communication path when the pressure difference between the first pressure and the second pressure is created, and
  subsequently set an opened condition of the communication path.

17. The device according to claim 16, wherein the coffee chamber is at least one of a brewing chamber for accommodating a coffee making process and a container for storing coffee particles to be used in the coffee making process.

18. The device according to claim 16, wherein the pressure difference creating arrangement comprises a pump for moving gas out of the low pressure chamber.

19. The device according to claim 16, wherein the pressure difference creating arrangement comprises a steam generator for supplying steam to the low pressure chamber, the device further comprising a communication path connecting the steam generator to the low pressure chamber, and an arrangement which is configured to set one of an opened condition and a closed condition of the communication path.

20. The device according to claim 19, wherein the coffee chamber is at least a brewing chamber for accommodating a coffee making process, and wherein the steam generator is also configured to supply steam to the brewing chamber, the device further comprising a communication path connecting the steam generator to the brewing chamber, and an arrangement for setting one of an opened condition and a closed condition of the communication path.

* * * * *